United States Patent
Wilson et al.

(10) Patent No.: US 6,362,153 B1
(45) Date of Patent: Mar. 26, 2002

(54) COMPOSITIONS OF PENTAFLUOROPROPANE AND DICHLOROTRIFLUOROETHANE

(75) Inventors: David Paul Wilson; Rajiv Ratna Singh, both of Erie County, NY (US); Ian Robert Shankland, Morris County, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/468,399

(22) Filed: Dec. 20, 1999

Related U.S. Application Data

(60) Provisional application No. 60/113,687, filed on Dec. 24, 1998.

(51) Int. Cl.[7] .................................................. C11D 17/00
(52) U.S. Cl. ...................................... 510/412; 510/415
(58) Field of Search .................................. 510/412, 415

(56) References Cited

U.S. PATENT DOCUMENTS

| | | | |
|---|---|---|---|
| 5,295,357 A | | 3/1994 | Masato Kaneko |
| 5,565,497 A | * | 10/1996 | Godbey et al. ............. 521/174 |
| 5,683,974 A | | 11/1997 | Lund et al. |
| 5,789,455 A | * | 8/1998 | Kitamura et al. ........... 521/130 |
| 5,895,793 A | * | 4/1999 | Kitamura et al. ........... 510/412 |
| 5,925,612 A | * | 7/1999 | Lund et al. ................. 510/415 |

FOREIGN PATENT DOCUMENTS

| | | |
|---|---|---|
| WO | WO95/13335 | 5/1995 |

OTHER PUBLICATIONS

Hughes, H. Michael *Contemporary Fluorocarbons*, Refrig. 21st Century, Ashra/Nist Refrig. American Society of Heating, Refrigerating and Air–Conditioning Engineers, Inc., Atlanta, GA XP002135629, pp. 119–121 (1997).
Section Ch. Week 199342, Derwent Publications Ltd., London. GB; Class A60, AN 1993–331513 XP 002135630 & JP 05 239251 A (Daikin Logyo KK), Sep. 17, 1993 abstract.

* cited by examiner

*Primary Examiner*—John M. Cooney, Jr.
(74) *Attorney, Agent, or Firm*—Synnestvedt & Lechner LLP

(57) ABSTRACT

Compositions of 1,1,1,3,3 -pentafluoropropane and 1,1 -dichloro-2,2,2-trifluoroethane are provided. The compositions of the invention are environmentally desirable for use as refrigerants, aerosol propellants, blowing agents for polymer foam, heat transfer media, gaseous dielectrics and solvents.

6 Claims, No Drawings

COMPOSITIONS OF PENTAFLUOROPROPANE AND DICHLOROTRIFLUOROETHANE

This appln claims benefit of Prov. No. 60/113,687 filed Dec. 24, 1998.

FIELD OF THE INVENTION

The present invention relates to mixtures of 1,1,1,3,3-pentafluoropropane ("HFC-245fa") and 1,1-dichloro-2,2,2-trifluoroethane ("HCFC-123"). More particularly, the invention provides compositions of HFC-245fa and HCFC-123 that are environmentally desirable for use as refrigerants, in centrifugal chillers, aerosol propellants, metered dose inhalers, fire extinguishers, blowing agents for polymer foam, heat transfer media, gaseous dielectrics, and solvents.

BACKGROUND OF THE INVENTION

Fluorocarbon based fluids have found widespread use in industry in a number of applications, including as refrigerants, aerosol propellants, blowing agents, heat transfer media, and gaseous dielectrics. Because of the suspected environmental problems associated with the use of some of these fluids, it is desirable to use fluids of lesser ozone depletion potential such as hydrofluorocarbons, ("HFC's") and/or hydrochlorofluorocarbons ("HCFC's").

Thus, the use of fluids that do not contain CFC's or contain HCFC's instead of CFC's is desirable. Additionally, it is known that the use of single component fluids or azeotropic mixtures, which mixtures do not fractionate on boiling and evaporation, is desirable. However, the identification of new, environmentally safe, azeotropic mixtures is complicated due to the fact that it is difficult to predict azeotrope formation.

The art continually is seeking new fluorocarbon based mixtures that offer alternatives, and are considered environmentally safe substitutes, for CFC's and HCFC's. Of particular interest are mixtures containing a fluorocarbon and hydrochlorocarbon both of low ozone depletion potentials; it is these mixtures that are the subject of this invention.

DESCRIPTION OF THE INVENTION AND PREFERRED EMBODIMENTS

This invention provides azeotrope-like and nonazeotrope-like compositions of HFC-245fa and HCFC-123. The compositions of the invention provide environmentally desirable for currently used CFC's and HCFC's since HFC-245fa and HCFC-123 have zero and very low ozone depletion potentials, respectively. Additionally, the compositions of the invention exhibit characteristics that make the compositions better CFC and HCFC substitutes than either HFC-245fa or HCFC-123 alone.

One embodiment of the invention provides azeotrope-like compositions comprising effective amounts of HFC-245fa and HCFC-123. By "effective amounts" is meant the amount of each component that, on combination with the other component, results in the formation of an azeotrope-like composition. More specifically, the invention provides azeotrope-like compositions preferably of from about 90 to about 99 weight percent HFC-245fa and from about 10 to about 1 weight percent HCFC-123 having a boiling point of 15° C.±2, preferably±1° C., at 760 mm. The preferred, more preferred, and most preferred compositions of the invention are set forth in Table 1. The numerical ranges in Table 1 are to be understood to be prefaced by the term "about".

TABLE 1

| Components | Preferred (wt %) | More Preferred (wt %) | Most Preferred (wt %) |
| --- | --- | --- | --- |
| HFC-245fa | 90–99 | 94–99 | 97–99 |
| HCFC-123 | 10–1 | 6–1 | 3–1 |

For purposes of this invention, azeotrope-like compositions are compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the state pressure and temperature. In practice, this means that the components of an azeotropic mixture are constant boiling and cannot be separated during a phase change.

Azeotrope-like compositions behave like azeotropic mixtures, i.e., are constant boiling or essentially constant boiling. In other words, for azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotrope-like compositions of the invention within the indicated ranges as well as certain compositions outside these ranges are azeotrope-like.

The azeotrope-like compositions of the invention may include additional components that do not form new azeotropic or azeotrope-like systems, or additional components that are not in the first distillation cut. The first distillation cut is the first cut taken after the distillation column displays steady state operation under total reflux conditions. One way to determine whether the addition of a component forms a new azeotropic or azeotrope-like system so as to be outside of this invention is to distill a sample of the composition with the component under conditions that would be expected to separate a nonazeotropic mixture into its separate components. If the mixture containing the additional component is nonazeotropic or nonazeotrope-like, the additional component will fractionate from the azeotropic or azeotrope-like components. If the mixture is azeotrope-like, some finite amount of a first distillation cut will be obtained that contains all of the mixture components that is constant boiling or behaves as a single substance.

It follows from this that another characteristic of azeotrope-like compositions is that there is a range of compositions containing the same components in varying proportions that are azeotrope-like, or constant boiling. All such compositions are intended to be covered by the terms "azeotrope-like" and "constant boiling". As an example, it is well known that at differing pressures, the composition of a given azeotrope will vary at least slightly as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

In another embodiment of the invention, nonazeotrope-like compositions are provided which compositions comprise HFC-245fa and HCFC-123 and which have a vapor pressure of about 18 psia to about 19 psia at 20° C. Preferably, the compositions of the invention comprise from about 90 to about 99 weight percent HFC-245fa and from about 10 to about 1 weight percent HCFC-123a. The preferred, more preferred, and most preferred compositions of this embodiment are set forth in Table 2. The numerical ranges in Table 2 are to be understood to be prefaced by the term "about."

TABLE 2

| Components | Preferred (wt %) | More Preferred (wt %) | Most Preferred (wt %) |
| --- | --- | --- | --- |
| HFC-245fa | 90–99 | 94–99 | 97–99 |
| HCFC-123 | 10–1 | 6–1 | 3–1 |

The compositions of the invention meet the need in the art for CFC/HCFC mixtures that have a low ozone depletion potential and are negligible contributors to greenhouse global warming, are nonflammable, and have an appropriate compressor discharge temperature. Additionally, the compositions of the invention offer superior refrigeration capacity when compared to such fluids as HFC-245fa or HCFC-123 alone. Further, because the azeotrope-like compositions of the invention exhibit constant vapor pressure characteristics and relatively minor composition shifts as the liquid mixture is evaporated, the azeotrope-like composition of the invention are comparable to a constant boiling single component refrigerant or an azeotropic mixture refrigerant.

In a process embodiment, the compositions of the invention may be used in a method for producing refrigeration that comprises condensing a refrigerant comprising the azeotrope-like or nonazeotrope-like compositions of this invention and thereafter evaporating the refrigerant in the vicinity of a body to be cooled. In yet another process embodiment, the compositions of the invention may be used in a method for heating that comprises condensing a refrigerant comprising the azeotrope-like or nonazeotrope-like compositions of the invention in the vicinity of a body to be heated and thereafter evaporating the refrigerant.

In another embodiment, the compositions of the invention may be used in centrifugal chillers. By "centrifugal chillers" is meant refrigeration equipment that uses centrifugal compression to compress the refrigerant. The invention provides a method for producing refrigeration using a centrifugal compressor comprising compressing a refrigerant comprising the azeotrope-like or nonazeotrope-like compositions of the invention and thereafter evaporating the refrigerant in the vicinity of a body to be cooled.

In still another embodiment, the compositions of the invention may be used in a method for producing foam comprising blending a heat plasticized resin with a volatile bowing agent comprising the azeotrope-like or nonazeotrope-like compositions of the invention and introducing the resin/volatile blowing agent blend into a zone of lower pressure to cause foaming.

In another process embodiment, the compositions of the invention are used in method for producing polyurethane and polyisocyanurate foams. Any of the methods well known in the art such as those described in "Polyurethanes Chemistry and Technology," Volumes I and II, Saunders and Frisch, 1962, John Wiley and Sons, New York, N.Y.. In general, the method comprises preparing polyurethane or polyisocyanurate foams by combining an isocyanate, a polyol or mixture of polyols, a blowing agent or mixture of blowing agents, and other materials such as catalysts, surfactants, and optionally, flame retardants, colorants, or other additives. The blowing agent or agents employed shall be a volatile mixture of the azeotrope-like or nonazeotrope-like compositions of the present invention.

It is convenient in many applications to provide the components for polyurethane or polyisocyanurate foams in preblended formulations. Most typically, the foam formulation is preblended into two components. The isocyanate and optionally certain surfactants and blowing agents comprise the first component, commonly referred to as the "A" component. The polyol or polyol mixture, surfactant, catalysts, blowing agents, flame retardant, and other isocyanate reactive components comprise the second component, commonly referred to as the "B" component. Accordingly, polyurethane and polyisocyanurate foams are readily prepared by bringing together the A and B side components either by hand mix for small preparations and, preferably, machine mix techniques to form blocks, slabs, laminates, pour-in-place panels and other items, spray applied foams, froths, and the like. Optionally, other ingredients such as fire retardants, colorants, auxiliary blowing agents, water, and even other polyols can be added as a third stream to the mix head or reaction site. Most conveniently, however, they are all incorporated into one B component as described above.

It is also possible to produce thermoplastic foams using the compositions of the invention. For example, conventional foam polyurethanes and isocyanurate formulations may be combined with the azeotrope-like or nonazeotrope-like composition in a conventional manner to produce rigid foams.

Azeotrope-like and nonazeotrope-like mixtures containing HFC-245fa are particularly suitable as foam blowing agents since foams blown with HFC-245fa have been found to possess low relative initial and aged thermal conductivity and good dimensional stability at low temperatures. Of particular interest are those mixtures that contain HFC-245fa and other zero or low ozone depletion HFC's and/or HCFC's.

The compositions of the invention may also be used as heat transfer fluids. For example, in certain refrigeration systems, it is desirable to operate the system at a specific temperature. However, maintaining the desired temperature may require either the addition or removal of heat. Thus, a secondary heating loop containing an appropriate heat transfer fluid may be added. The heat transfer fluid absorbs heat in one part of the cycle and transfers the heat to another part of the cycle without changing state, when the heat transferred is sensible, or by changing state, when the heat transferred is latent.

In another embodiment, the mixtures and compositions of this invention may be used as propellants in sprayable compositions, either alone or in combination with known propellants. The sprayable composition comprises, consists essentially of, and consists of a material to be sprayed and a propellant comprising, consisting essentially of, and consisting of a mixture or composition of the invention. Inert ingredients, solvents, and other materials may also be present in the sprayable mixture. Preferably, the sprayable composition is an aerosol. Suitable materials to be sprayed include, without limitation, cosmetic materials such as deodorants, perfumes, hair sprays, cleansers, and polishing agents as well as medicinal materials such as anti-asthma and anti-halitosis medications.

The compositions of the invention may also be used in a method of dissolving contaminants or removing contaminants from the surface of a substrate, which method comprises the step of contacting the substrate with the compositions of the present invention. In another embodiment, the compounds and mixtures of the present invention may also be used as fire extinguishing agents.

The components of the composition of the invention are known materials that are commercially available or may be prepared by known methods. Preferably, the components are of sufficiently high purity so as to avoid the introduction of adverse influences on the properties of the system.

Additional components may be added to tailor the properties of the compositions of the invention as needed. By way of example, oil solubility aids may be added in the case in which the compositions of the invention are used as refrigerants.

The present invention is more fully illustrated by the following non-limiting examples.

EXAMPLES

Example 1

An ebulliometer consisting of a vacuum-jacketed tube with a condenser on top was used. About 11.3 g HFC-245fa were charged to the ebulliometer and HCFC-123 was added in small, measured increments. The temperature was measured using a platinum resistance thermometer. From about 0 to about 0.8 weight percent HCFC-123, the boiling point of the composition did not change. Therefore, the composition boils as a constant-boiling composition over this range.

Example 2

An ebulliometer consisting of a vacuum-jacketed tube with a condenser on top was used. About 16.7 g HFC-245fa were charged to the ebulliometer and HCFC-123 was added in small, measured increments. The temperature was measured using a platinum resistance thermometer. From about 0 to about 1.7 weight percent HCFC-123, the boiling point of the composition changed by only 0.02° C. Therefore, the composition boils as a constant-boiling composition over this range.

Example 3

This example demonstrates that constant-boiling blends of HFC-245fa and HCFC-123 have certain advantages compared to either HFC-245fa or HCFC-123 alone. The theoretical performance of a refrigerant at specific operating conditions can be estimated from the thermodynamic properties of the refrigerant using standard refrigeration cycle analysis techniques. See, e.g., R. C. Downing *Fluorocarbon Refrigerants Handbook*, Prentice Hall (1988). The coefficient of performance, COP, is a universally accepted measure especially useful in representing the relative thermodynamic efficiency of a refrigerant in a specific heating or cooling cycle involving evaporation or condensation of a refrigerant. This term expresses the ratio of useful refrigeration to the energy applied by the compressor in compressing the vapor. The capacity of a refrigerant represents the volumetric efficiency of the refrigerant. This value expresses the capability of a compressor to pump quantities of heat for a given volumetric flow rate of refrigerant. In other words, given a specific compressor, a refrigerant with a higher capacity will deliver more cooling or heating power.

This type of calculation is performed for an air conditioning cycle in which the condenser temperature was 110° F. and the evaporator temperature was 35° F. Compression efficiency of 85 %, superheat of 20° F., and a subcooling of 10° F. were assumed. Calculations were performed for various combinations of HFC-245fa and HCFC-123 and for HFC-245fa and HCFC-123 as single components. Table 3 lists the COP and capacities of the compositions of the invention relative to HFC-245fa and HCFC-123.

TABLE 3

Thermodynamic Performance

| Refrigerant | COP | Capacity (cfm) |
| --- | --- | --- |
| HCFC-123 | 4.85 | 540 |
| HFC-245fa/HCFC-123 (99/1 wt %) | 4.76 | 833 |
| HFC-245fa/HCFC-123 (97/3 wt %) | 4.76 | 833 |
| HFC-245fa/HCFC-123 (94/6 wt %) | 4.77 | 831 |
| HFC-245fa/HCFC-123 (90/10 wt %) | 4.77 | 829 |
| HFC-245fa | 4.70 | 812 |

As Table 3 illustrates, the compositions of the invention are better than either pure component HFC-245fa or HCFC-123 in terms of refrigeration capacity, and are comparable in terms of COP.

Example 4

40 g of each of the azeotrope-like compositions given in Table 1 are charged into individual 200 cc sealed vessels containing 3 g on Dow styrene 685D. The vessels are placed in a 250° F. oven overnight. Twenty-four hours later, the vessels are removed from the oven and rapidly depressurized. The resulting foams are inspected and found to be of good quality.

Example 5

This example illustrates the use of preferred azeotrope-like compositions of the invention to clean (deflux) printed wiring boards and printed wiring assemblies. A commercial rosin based flux viz. Kenco 885 (manufactured by Kenco Industries, Inc.) is used in this test.

In the experiment FR-4 eoxy coupons cut to a size of 1"×2.25" are used for flux and subsequent cleaning. Prior to fluxing all specimen are precleaned to ensure very low levels of contamination before fluxing. The contamination is measured by measuring conductivity of the wash solution (in equivalent micrograms of sodium chloride) per square inch of the boards using a conductivity bridge. (See U.S. Pat. No. 4,816,175). Using this technique, it is determined that all specimens are precleaned to 0.05 micrograms or less of sodium chloride equivalents.

A measured amount of Kenco 885 flux is applied to each of the coupons. The coupons are air dried and dried at 90 C for 5 minutes and baked at 230 C for 1 minute. This procedure mimics the Hollis wave solder machine. The amount of ionic materials left in the board after the drying process is of the same order of magnitude as in a wave solder machine.

These fluxed coupons are then cleaned in the boiling solvents for two minutes, after which the amount of ionics is washed off by a 75/25 by weight water/isopropanol (IPA) mixture for 24 hours. The conductivity of the water/IPA mixture is measured as described previously.

The cleaning study results show that the solvent (245fa/123) mixtures of the invention remove ionic impurities much more efficiently than 245fa alone.

What is claimed is:

1. Azeotrope-like compositions consisting essentially of an effective amount of 1,1,1,3,3-pentafluoropropane and 1,1-dichloro-2,2,2-trifluoroethane which compositions boil at about 15° C.±2° C. at 760 mm Hg.

2. The compositions of claim 1 consisting essentially of from about 99 to about 90 weight percent 1,1,1,3,3-pentafluoropropane and from about 1 to about 10 weight percent 1,1-dichloro-2,2,2-trifluoroethane.

3. The compositions of claim 1 consisting essentially of from about 99 to about 94 weight percent 1,1,1,3,3-pentafluoropropane and from about 1 to about 6 weight percent 1,1-dichloro-2,2,2-trifluoroethane.

4. The compositions of claim 1 consisting essentially of from about 99 to about 97 weight percent 1,1,1,3,3-pentafluoropropane and from about 1 to about 3 weight percent 1,1-dichloro-2,2,2-trifluoroethane.

5. Compositions comprising 1,1,1,3,3-pentafluoropropane and 1,1-dichloro-2,2,2-trifluoroethane having a vapor pressure of from about 18 psia to about 19 psia at 20° C.

6. The compositions of claim 5 consisting essentially of 1,1,1,3,3-pentafluoropropane and 1,1-dichloro-2,2,2-trifluoroethane.

* * * * *